United States Patent
Sotgiu et al.

(10) Patent No.: US 10,677,677 B2
(45) Date of Patent: Jun. 9, 2020

(54) WHEEL SERVICING MACHINE WITH FORCE DETECTING DEVICE

(71) Applicant: Snap-on Equipment Srl a unico socio, Correggio (IT)

(72) Inventors: Paolo Sotgiu, Modena (IT); Pietro Azzari, Gonzaga (IT); Lillo Gucciardino, Bomporto (IT); Marco Tralli, Modena (IT)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 124 days.

(21) Appl. No.: 16/012,554

(22) Filed: Jun. 19, 2018

(65) Prior Publication Data
US 2018/0372575 A1 Dec. 27, 2018

(30) Foreign Application Priority Data
Jun. 23, 2017 (DE) .................. 10 2017 114 018

(51) Int. Cl.
*G01M 1/04* (2006.01)
*G01N 3/04* (2006.01)

(52) U.S. Cl.
CPC .............. *G01M 1/045* (2013.01); *G01N 3/04* (2013.01); *G01N 2203/0274* (2013.01); *G01N 2203/0494* (2013.01)

(58) Field of Classification Search
CPC .................................................. G01M 1/045; G01M 1/06; G01N 2203/0274; G01N 2203/0494; G01N 3/04
See application file for complete search history.

(56) References Cited

U.S. PATENT DOCUMENTS

| 5,423,217 A | 6/1995 | Himmler et al. |
| 5,615,574 A | 4/1997 | Drechsler et al. |
| 5,948,980 A | 9/1999 | Rossteuscher |
| 6,928,871 B2 | 8/2005 | Rothamel |
| 9,132,706 B2 * | 9/2015 | Bonacini ............. B60C 25/0542 |
| 9,199,519 B2 * | 12/2015 | Bonacini ............. B60C 25/0545 |

FOREIGN PATENT DOCUMENTS

| DE | 4229593 A1 | 3/1994 |
| DE | 19713075 A1 | 10/1998 |
| DE | 10238271 A1 | 3/2004 |
| EP | 0550816 A2 | 7/1993 |
| EP | 1391711 A2 | 2/2004 |
| EP | 2639078 A1 | 9/2013 |

OTHER PUBLICATIONS

German Examination Report dated Jan. 30, 2018 for German Application No. 10 2017 114 018.2.

* cited by examiner

*Primary Examiner* — David B. Thomas
(74) *Attorney, Agent, or Firm* — Miles & Stockbridge, P.C.

(57) ABSTRACT

The present invention relates to a wheel clamping system for reversibly clamping a motor vehicle wheel with a rim onto a wheel servicing machine, wherein the wheel clamping system comprises at least one force measuring device for measuring the value of a clamping force exerted by the wheel clamping system on a rim of a motor vehicle wheel held on the main shaft.

20 Claims, 5 Drawing Sheets

WHEEL SERVICING MACHINE WITH FORCE DETECTING DEVICE

Figure 1:
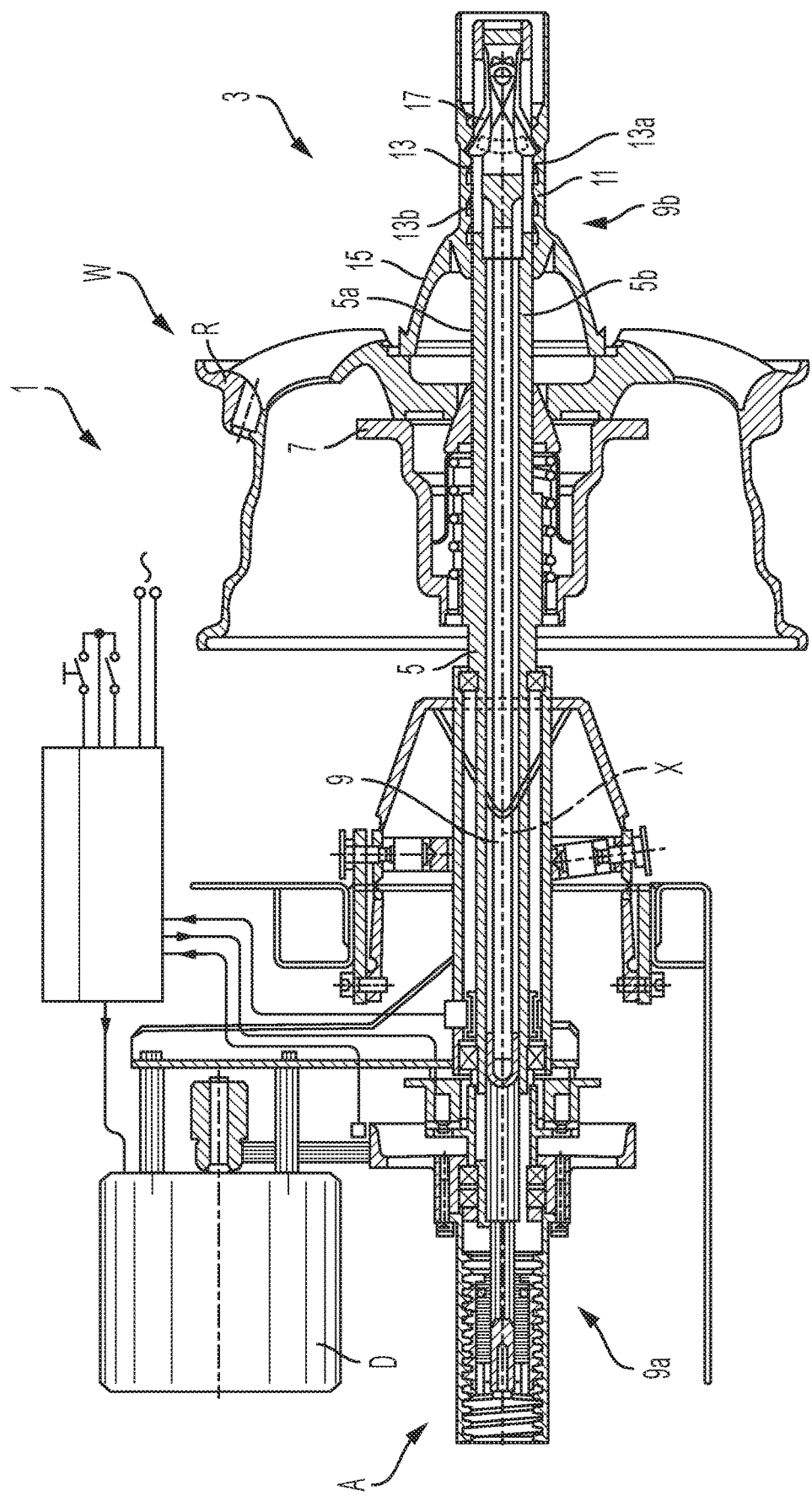

This application claims the benefit of prior-filed German Application No. 102017114018.2 filed on Jun. 23, 2017 in the German Patent Office, which is incorporated by reference in its entirety.

The present invention relates to a tire clamping system according to claim 1 or 2, in particular a tire clamping system for releasably clamping a motor vehicle wheel with a rim onto a wheel servicing machine in the form of a wheel balancing machine or a tire fitting machine, respectively.

According to a first aspect of the present invention, a wheel clamping system of claim 1 for reversibly clamping a motor vehicle wheel with a rim onto a wheel balancing machine comprises a hollow main shaft for holding a motor vehicle wheel, a turntable for providing an abutment for a rim of a motor vehicle wheel held on the main shaft, a pull rod for pulling a wheel held on the main shaft into abutment with the turntable, and a handle for acting on a rim of a motor vehicle wheel held on the main shaft. The main shaft defines an axial direction and is coupled to a drive means of the wheel balancing machine to rotate the main shaft. The turntable is fixedly connected to the main shaft. The pull rod has a first end portion which is slidably received within the main shaft, and a second end portion which projects beyond the turntable. The first end portion is coupled to an actuator of the wheel balancing machine for axial movement of the pull rod, and the second end portion is provided with clamping jaws. The clamping jaws are movable between a closed position and an open position, wherein the clamping jaws are within an outer circumference of the main shaft when the clamping jaws are in the closed position, and the clamping jaws protrude beyond the outer circumference of the main shaft when the clamping jaws are in the open position. The handle has a coupling surface with which the clamping jaws engage when the clamping jaws are in the open position.

A wheel clamping system of the aforementioned kind is known from EP 0 550 816 A2 and EP 1 391 711 A2, for example.

According to a second aspect of the present invention, a wheel clamping system of claim 2 for reversibly clamping a motor vehicle wheel with a rim onto a tire fitting machine comprises a main shaft for holding a motor vehicle wheel, a turntable for providing an abutment for a rim of a motor vehicle wheel held on the main shaft, a fixing element and at least one clamping device for reversibly coupling the fixing element to the main shaft. The main shaft is rotatably supported by the tire fitting machine and defines an axial direction. The main shaft comprises a first end portion which is connected to a drive means of the tire fitting machine for rotating the main shaft, and a second end portion having a bore. The turntable is coupled to the second end portion of the main shaft and is axially movable relative to the main shaft. The fixing element has a contact portion for abutting against a rim of a wheel held on the main shaft, and a shaft, said shaft having a first end portion insertable into the bore of the main shaft and a second end portion on which the contact portion is arranged. The shaft of the fixing element has a coupling surface for coupling to the at least one clamping device in order to fix the axial position of the contact portion of the fixing element relative to the main shaft.

A wheel clamping system of the aforementioned kind is known from EP 2 639 078 A1, for example.

DE 42 29 593 A1 discloses a measuring apparatus for measuring forces which occur when a rotary body is clamped on a testing machine drive shaft include a face clamping force measuring means for measuring face clamping forces acting between said rotary body and a clamping element contact face which is disposed perpendicularly to the axis of the rotary body.

DE 197 13 075 A1 discloses a method and an arrangement for releasably clamping a motor vehicle wheel to a shaft of a balancing machine, in which when clamping the wheel on the shaft a clamping means is held fast and the shaft is driven in rotation by the drive motor of the machine.

The rim of a motor vehicle wheel is normally a sensitive structure which is to be treated with great care when clamping or servicing it. However, prior art wheel clamping systems may clamp the rim too tightly during the clamping operation and cause deformation of the rim. Deformation of the wheel rim can have a substantial influence on the behavior of the motor vehicle fitted with the wheel and should therefore be avoided.

The object of the present invention is to provide a wheel clamping system for reversibly clamping a motor vehicle wheel onto a wheel balancing machine or a tire fitting machine, which reduces the risk of deforming the wheel rim during the clamping operation.

According to the present invention, this object is achieved by a wheel clamping system of claims 1 and 2. The value or the curve of the clamping or tensioning force is thus used to ensure that the wheel and its rim are correctly clamped or handled during clamping or servicing.

A force detecting device may be constructed from a force transducer and an associated measuring unit. The general principle is that the force transducer is generally exposed to the force to be detected or measured, and a resultant change in some other measurable physical variable of the force transducer, for example the electrical resistance, is measured by the measuring unit. The measuring unit may comprise an analyzer unit and an analog/digital converter, if necessary. The force transducer may be supplied with energy from an energy source. The measuring unit can process the output received from the force transducer before the output is communicated to an output unit. For example, the output unit may be a display device or a sound generator, and the output from the force transducer may be shown on the display device to an operator or converted by the sound generator into an acoustic signal which is audible to an operator. The display device, for example a digital display, can indicate the measured value in units of force or in some other units, such as volts.

Given that the clamping force can change quickly during the clamping operation, it may be desirable that the force detecting device communicates the output directly to a control unit having a data capturing unit, for example to a microcontroller. The output can then be communicated to a display and displayed for an operator.

A person skilled in the art is familiar with various kinds of force transducer and knows that they can be used in conjunction with further devices of varying complexity. Strain gauge load cells, for example, are a kind of force transducer in widespread use.

The force transducer is preferably provided as an integral part of the wheel clamping system. It is also advantageous when the force transducer is arranged close to the wheel in its clamped state. However, the measuring unit may be arranged a certain distance away from the at least one force detecting device. The force detecting device may be operably connected to the turntable or the main shaft, or to a component coupled to those components. Additionally or alternatively, a wheel clamping system according to the first aspect of the present invention may have a force detecting device which is operably connected to the handle, and a wheel clamping system according to the second aspect of the present invention may have a force detecting device which is operably connected to the fixing element. In the latter case, the force transducer may be provided at the contact portion or the shaft of the fixing element.

When the force detecting device is used in a tire fitting machine which is equipped with a working tool, the force detecting device can also be used to measure the value of a force or a torque which the working tool exerts on the wheel while fitting a tire onto the wheel rim or while removing a tire from the wheel rim.

A third aspect of a wheel clamping system shall now be described, which may also be provided independently of the first aspect of a wheel clamping system of the present invention.

In order to provide a wheel clamping system for reversibly clamping a wheel onto a wheel balancing machine, and which allows a wheel to be clamped in a simplified manner between the turntable and the handle, it is proposed, according to the third aspect of the present invention, that the handle be further provided with at least one force detecting device for determining an amount of force which the handle exerts on the rim of a wheel held on the main shaft, and with at least one signal transducer which is operably connected to the at least one force detecting device. The at least one signal transducer may be configured to then transmit a control signal wirelessly to at least one signal receiver of the wheel balancing machine, the signal receiver being operably connected to the drive means, when the determined amount of force reaches a predetermined or predefined threshold value, such that the drive means is actuated and the wheel clamping system performs a reversible clamping operation.

This means that a wheel held on the main shaft is clamped onto the turntable when at least a predetermined force is exerted on the rim by an operator using the handle. The amount of force can be determined by at least one force detecting device and communicated to at least one signal transducer of the handle. The determined amount of force can be compared with a predetermined threshold value by means of a control unit of the at least one force detecting device or of the at least one signal transducer. The amount of force exerted by the handle on the rim can be determined either directly or indirectly. The force detecting device preferably comprises at least one load cell. When the predetermined threshold value has been reached, the at least one signal transducer wirelessly transmits a corresponding control signal to at least one signal receiver of the wheel balancing machine, which in turn communicates with the drive means. The at least one signal transducer may be integrated into the force detecting device. Alternatively, the at least one signal transducer and the at least one force detecting device may be provided physically separated from each other. The at least one signal receiver may similarly be integrated in the drive means or be spaced apart from it. The drive means is actuated in response to the control signal, so that the wheel clamping system clamps or unclamps the wheel. Communication between the at least one force detecting device and the at least one signal transducer, and between the at least one signal receiver and the drive means may be wireless, but need not be.

According to a preferred embodiment, the handle has a sleeve-shaped portion and a conically shaped portion. The sleeve-shaped portion may have an inner contact portion having a plurality of grooves that can engage the clamping jaws. The conically shaped portion may be adapted to abut against a rim of a wheel held on the main shaft.

The at least one force detecting device may be used only for a clamping operation or only for an unclamping operation of the wheel clamping system. A clamping operation may be initiated, for example, by an operator pushing the handle with sufficient force against a rim of a wheel mounted on the main shaft. An unclamping operation may be initiated by actuating a foot pedal of the wheel balancing machine. Alternatively, the handle may also include an unclamping element operably connected to the signal transducer, such that an unclamping signal is wirelessly transmitted to the signal receiver. The unclamping element may be designed for manual actuation by an operator holding the handle. The unclamping element may be a pushbutton or a switch disposed on the handle.

According to another preferred embodiment, the handle may be used not only to initiate the clamping operation, but also to initiate the unclamping operation of the wheel clamping system. To that end, the at least one signal transducer may be configured to wirelessly transmit a clamping signal to the at least one signal receiver when the force exerted by the handle on the rim has a magnitude which reaches or exceeds a first predefined threshold (from below). A clamping signal may eventually cause the drive means to pull the pull rod in a first axial direction in order to clamp the wheel onto the turntable. The at least one signal transducer may also be configured to transmit an unclamping signal wirelessly to the at least one signal receiver when the force exerted by the handle on the rim has a magnitude which reaches or falls below a second predefined threshold (from above). An unclamping signal may eventually cause the drive means to pull the pull rod in a second axial direction in order to unclamp or release the wheel from the turntable. The first predefined threshold value is preferably equal to the second predefined threshold value. Alternatively, the first predetermined threshold value may also differ from the second predetermined threshold value.

For safety reasons, the force detecting device may be operably connected to a control element for controlling the operation of the force detecting device. Alternatively, the signal transducer may be operably connected to a control element for controlling the wireless transmission of the control signal. To that end, the control element may be designed to be manually operated by an operator. The control element may be a pushbutton or a switch disposed on the handle. It is preferred that the force detecting device or the signal transducer is activated and therefore ready for operation when the control element is in an activated state. However, when the control element is in a deactivated state, the force detecting device or the signal transducer is also deactivated and not operational. The control element may also be brought into an activated state by detecting that an operator's foot is located in a recess provided in a frame of the wheel balancing machine.

Operation of the force detecting device may be initiated by configuring the handle in such a way that a gripping portion to be gripped by an operator is axially movable relative to the rest of the handle. Relative movement between the gripping portion and the rest of the handle can be brought about by pressing the handle against a rim of a wheel which is held on the main shaft and which is to be clamped between the handle and the turntable, and by pulling the handle away from the rim of a wheel which is held on the main shaft and which is clamped between the handle and the turntable so as to cause the handle to detach itself from the rim and to unclamp the wheel thereby.

According to one embodiment, the handle has an inner shell and an outer shell, the force detecting device being arranged either on the inner shell or the outer shell, and a relative movement between the inner and the outer shells triggering operation of the force detecting device.

The force exerted on the rim by an operator by means of the handle may also be displayed on a display unit.

The present disclosure also relates to a method for reversibly clamping a wheel onto a wheel balancing machine using a wheel clamping system of the kind described above. In order to clamp a wheel held on the main shaft onto the turntable, the method comprises the step of sliding the handle onto the main shaft and pressing the handle into contact with the rim of the wheel with an amount of force which reaches or exceeds a predetermined threshold value, such that the signal transducer wirelessly transmits a control signal to the signal receiver, with the result that the drive means is actuated and the wheel clamping system performs a reversible clamping operation.

The step of pressing the handle into contact with the rim of the wheel is preferably performed with a force exceeding a first predetermined threshold value, so that the signal transducer wirelessly transmits a clamping signal to the signal receiver. In order to release or unclamp a wheel held on the main shaft from the turntable, the method may further comprise the step of pulling on the handle clamping the wheel onto the turntable until a force exerted on the rim of the wheel by means of the handle falls below a second predetermined threshold value. This causes the signal transducer to transmit an unclamping signal wirelessly to the signal receiver. The first predetermined threshold value may, but need not be equal to the second predetermined threshold value.

The present invention relates further to a wheel balancing machine having the wheel clamping system described above.

The present invention also relates to a tire fitting machine which includes the wheel clamping system described in the foregoing.

Figure 2:
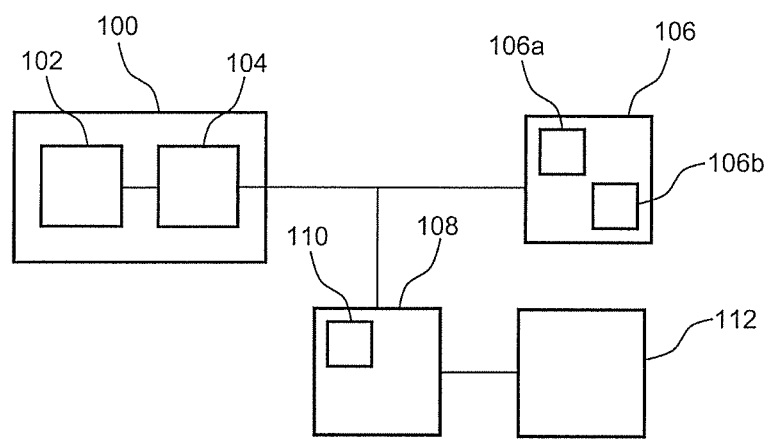
Figure 3:
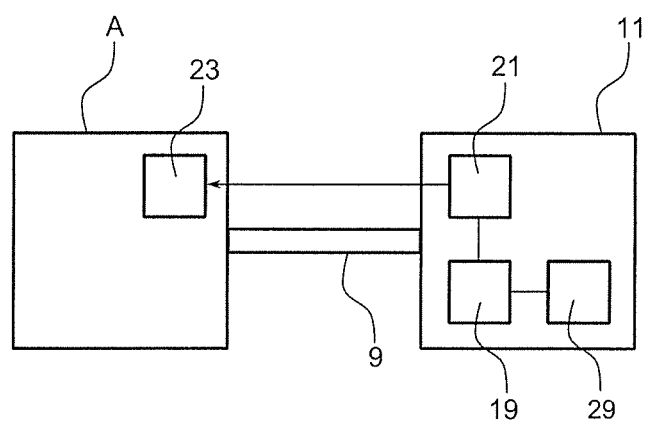
Figure 4:
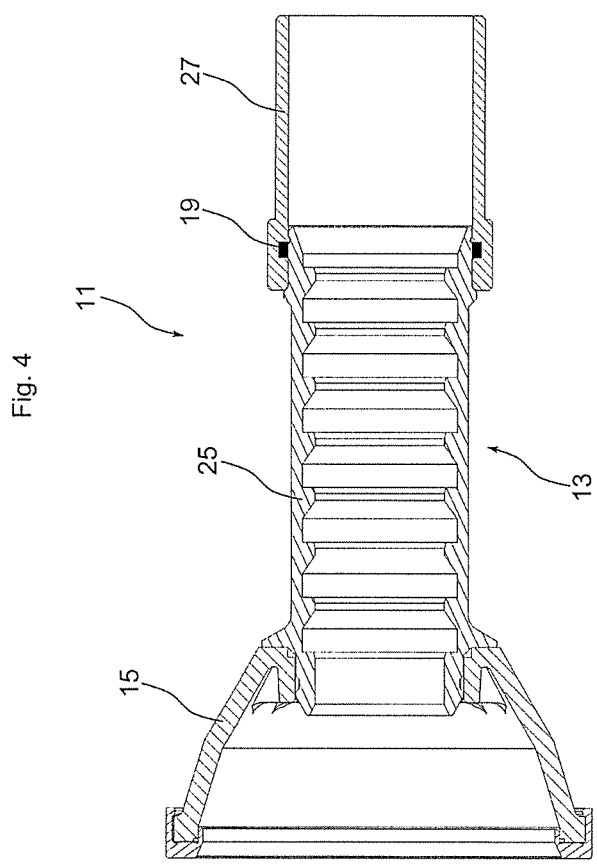
Figure 5:
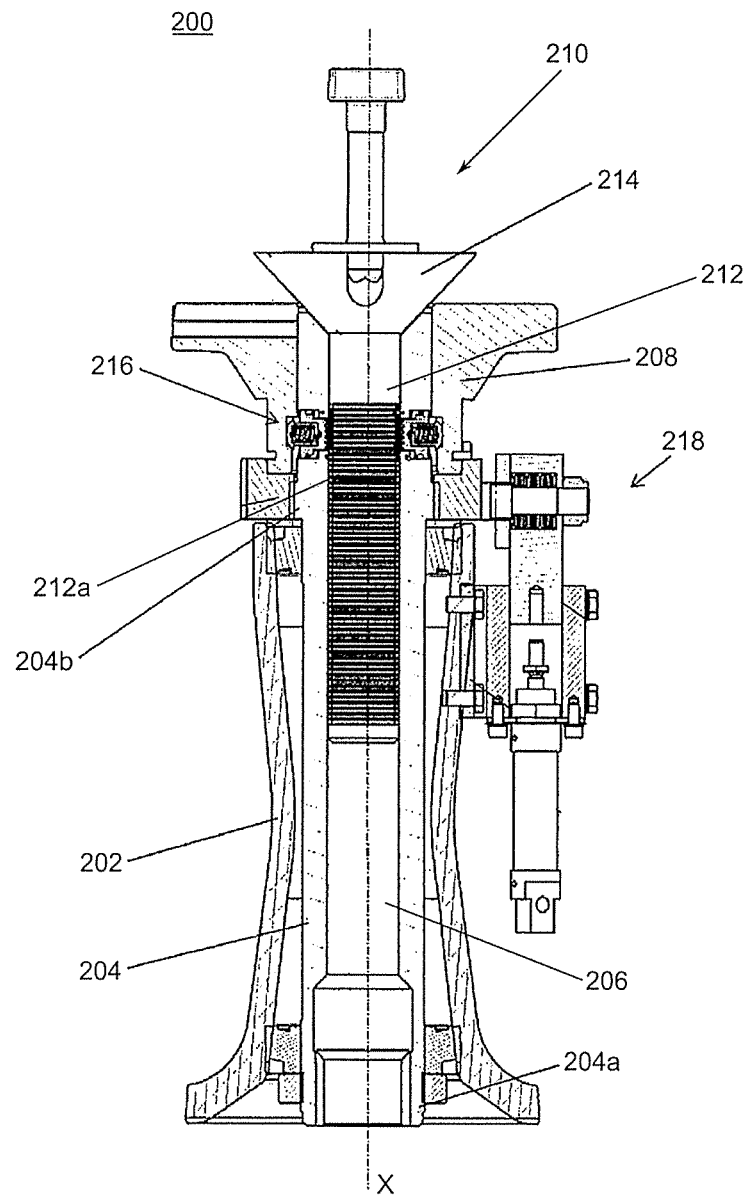

Further objects, features and advantages of the present invention follow from the following Figures, in which:

FIG. 1 shows a wheel clamping system of a prior art wheel balancing machine,

FIG. 2 shows the manner of operation of a force detecting device of a wheel clamping system according to the first and second aspects of the present invention, in a highly schematic view, FIG. 3 shows the use of the handle of a wheel clamping system according to the first aspect of the present invention, in a highly schematic view, FIG. 4 shows a handle, comprising an inner and an outer shell, of a wheel clamping system according to the first aspect of the present invention, and FIG. 5 shows a wheel clamping system of a prior art tire fitting machine.

FIG. 1 shows a wheel balancing machine 1 according to the prior art (EP 1 391 711 A2), with a wheel clamping system 3. Wheel clamping system 3 is used for reversibly clamping a motor vehicle wheel W onto wheel balancing machine 1.

Wheel clamping system 3 comprises a hollow main shaft 5, a turntable 7, a pull rod 9 and a handle 11. Handle 11 has a sleeve-shaped portion 13 and a conically shaped portion 15. The sleeve-shaped portion 13 can be gripped by an operator. Main shaft 5 defines an axial direction X and is rotatably held by wheel balancing machine 1. Main shaft 5 is coupled to a drive means D of wheel balancing machine 1, which causes rotational movement of main shaft 5. Turntable 7 is fixedly connected to main shaft 5. Pull rod 9 has a first end portion 9a slidably received in main shaft 5 and a second end portion 9b protruding beyond turntable 7. The first end portion 9a of the pull rod is coupled to a drive means A of wheel balancing machine 1 to cause axial movement of pull rod 9. The second end portion 9b of the pull rod is provided with clamping jaws 17, which are movable between a closed position and an open position. For example, an elastic element such as a spring may be provided between clamping jaws 17 so that clamping jaws 17 move from the closed position into the open position. In the open position, clamping jaws 17 protrude beyond an outer circumference 5a of main shaft 5. The sleeve-shaped portion 13 of handle 11 has an inner coupling surface 13a with grooves 13b into which clamping jaws 17 latch when they are in their open position. When in the closed position, clamping jaws 17 are within or enclosed by the outer circumference 5a of main shaft 5.

Wheel clamping system 3 further comprises at least one force detecting device. FIG. 2 shows in schematic form a possible way of operating a first force detecting device 100. The first force detecting device 100 comprises a force transducer 102 and a measuring unit 104 operably connected to force transducer 102. Force transducer 102 is understood to be that part of force detecting device 100 which converts the applied force into an output which is measured by measuring unit 104. Measuring unit 104 may be operably connected to an output unit 106. Output unit 106 may be a display device 106a, for example a digital display, or a sound generator 106b, for example a loudspeaker. Measuring unit 104 may also be operably connected to a control unit 108. Control unit 108 may include a data capturing unit 110 to allow the measurement of rapidly changing clamping forces. Control unit 108 may be operably connected to a display device 112 for an operator to read. It is then possible for an operator observing display device 112 to control the clamping operation based on the magnitude of the clamping force, or the change in clamping force over time. The connections shown in FIG. 2 may be physical connections, such as wires, or they may be wireless connections.

When a wheel W with a rim R is to be reversibly clamped onto wheel balancing machine 1 by means of wheel clamping system 3 in accordance with the present invention, wheel W along with its rim R is pushed onto main shaft 5 and then clamped between handle 11 and turntable 7, before the value of a clamping force acting on wheel rim R is measured by means of the first force detecting device 100. When the measured value of the clamping force exceeds a predetermined threshold value, an operator can be notified thereof either by output unit 106 and a notice to that effect on display device 106a, or by sound generator 106b emitting an acoustic signal. The operator can then interrupt the clamping operation or terminate it completely. Such notification may inform the operator that wheel rim R is sufficiently clamped, for example, in which case the clamping operation may be ended, or it may indicate to the operator that wheel rim R is incorrectly aligned on turntable 7, in which case the clamping operation need only be interrupted. Alternatively, control unit 108 may be configured to stop the clamping operation completely or only temporarily if the predetermined threshold value is exceeded by the current value of the clamping force. The increase or decrease in the clamping force can also be used, instead of the value of the clamping force exceeding a predetermined threshold value, for regulation or control of the clamping operation, for example by control unit 108 or also by the operator.

According to an independent third aspect of the present invention, handle 11 may include a second force detecting device 19 for measuring the value of a force exerted by means of handle 11 on the rim of the wheel held on main shaft 5, as shown schematically in FIG. 3. Handle 11 may also include a signal transducer 21 operably connected to the second force detecting device 19. Moreover, drive means A may include a signal receiver 23 for receiving control signals wirelessly transmitted from signal transducer 21. In FIG. 3, handle 11 further comprises a control element 29, such as a switch, for controlling the operation of the second force detecting device 19, for example by switching it on and off.

If the second force detecting device 19 detects that a force exerted by handle 11 on rim R of wheel W mounted on main shaft 5 exceeds a predetermined threshold value, signal transducer 21 is configured to send a control signal wirelessly to signal receiver 23. Signal receiver 23 then causes actuation of drive means A connected to pull rod 9, so that wheel clamping system 3 performs a reversible clamping operation on wheel W.

According to the present invention, use of the second force detecting device 19 is optional. It is conceivable that the first force detecting device 100 takes over the functions of the second force detecting device 19, thus obviating the need for a separate component in the form of the second force detecting device 19.

FIG. 4 shows a handle 11 having an inner shell 25 and an outer shell 27. Outer shell 27 is used by an operator to grip handle 11 and is axially movable relative to inner shell 25, in particular when the conically shaped portion 15 abuts against a rim R of a wheel W. The relative axial movement between inner shell 25 and outer shell 27 triggers operation of the second force detecting device 19.

Use of wheel clamping system 3 shall now be described. When a wheel W held on main shaft 5 is to be clamped onto turntable 7 by means of handle 11, an operator slides handle 11 onto and along main shaft 5 and presses handle 11 against the rim R of wheel W. When the compressive force exerted by handle 11 on the rim R of wheel W reaches or exceeds a first predetermined threshold value (from below), signal transducer 21 transmits a clamping signal wirelessly to signal receiver 23. A clamping instruction is then communicated from signal receiver 23 to drive means A, which pulls pull rod 9 and thus handle 11 against turntable 7 until wheel W is securely clamped between turntable 7 and handle 11. Due to engagement of the clamping jaws 17 in the open position and sleeve-shaped portion 13 of handle 11, handle 11 moves together with pull rod 9.

In order to release wheel W from turntable 7, an operator pulls on handle 11 until the force exerted by handle 11 on rim R of wheel W reaches or falls below a second predetermined threshold value (from above). The first and second predetermined threshold values are preferably equal. Signal transducer 21 then wirelessly transmits an unclamping signal to signal receiver 23, which is communicated to drive means A in the form of an instruction to unclamp. In response thereto, drive means A pushes pull rod 9 in the direction of turntable 7, thus pushing handle 11 away from turntable 7 until wheel W is released from turntable 7 and handle 11 can be pulled from main shaft 5.

In order to describe the basic structure of a wheel clamping system according to the second aspect of the present invention, reference is made to EP 2 639 078 A1. FIG. 5 shows a wheel clamping system 200 of a tire fitting machine according to EP 2 639 078 A1.

Wheel clamping system 200 comprises a frame 202, a main shaft 204 having a bore 206, a turntable 208, a fixing element 210 having a shaft 212 and a contact portion 214, and a clamping device 216. Main shaft 204 has a first end portion 204a and a second end portion 204b opposite first end portion 204a. Main shaft 204 is connected at the first end portion 204a to a drive means (not shown) of tire fitting machine 200. Bore 206 may be provided at the second end portion 204b, but may also extend into the first end portion 204a or along the entire length of main shaft 204. Turntable 208 has a through hole 208a in which main shaft 204 is received. Turntable 208 is coupled to the second end portion 204b in such a way that turntable 208 is axially movable relative to main shaft 204. For example, the outer surface of main shaft 204 and an inner surface of through hole 208a may be in thread engagement, thus allowing relative axial movement between turntable 208 and main shaft 204. The interaction between turntable 208 and main shaft 204 is described in detail in EP 2 639 078 A1.

Shaft 212 of fixing element 210 is dimensioned in such a way that shaft 212 can be inserted into bore 206 of main shaft 204. Contact portion 214 is dimensioned in such a way that it abuts again a rim of a wheel positioned on turntable 208. Shaft 212 of fixing element 210 has a coupling surface 212a which is designed to engage with two clamping devices 216, so as to fix the axial position of contact portion 214 of fixing element 210 relative to main shaft 204. The interaction between the two clamping devices 216 and fixing element 210 is described in detail in EP 2 639 078 A1.

According to a second aspect of the present invention, the wheel clamping system 200 may be equipped with at least one force detecting device. With regard to the force detecting device, reference is made to the description of force detecting device 100, which was described in conjunction with wheel clamping system 3 according to the first aspect of the present invention. Force detecting device 100 may be operably connected to main shaft 204, turntable 208 or fixing element 112.

If a tire fitting machine is used that includes a working tool, force detecting device 100 can also be used to measure the value of a force or a torque exerted on the wheel by the working tool while fitting a tire onto the wheel rim or when removing a tire from the wheel rim.

When a wheel, not shown, with its rim is to be reversibly clamped onto the tire fitting machine by means of wheel clamping system 200, the wheel rim is positioned on main shaft 204 and turntable 208. The shaft 212 of fixing element 210 is then inserted into the bore 206 of main shaft 204, and contact portion 214 is brought into contact with the wheel rim. After that, the wheel can be clamped by wheel clamping system 200. To that end, the drive means rotates main shaft 204 in a first direction of rotation, while turntable 208 is held in a non-rotating position, preferably by a stopping device 218, with the result that turntable 208 moves in axial direction X along main shaft 204. This actuates both clamping devices 216, so that the latter engage with the coupling surface 212a of shaft 212 of fixing element 210. According to the second aspect of the present invention, the change over time in the clamping force exerted by the wheel clamping system 200 on the wheel rim is measured by force detecting device 100 and can then be monitored as in the wheel clamping system 100 described above.

In order to unclamp the wheel from wheel clamping system 200, the drive means rotates main shaft 204 in a second direction of rotation opposite to the first direction of rotation. The clamping and unclamping process performed by wheel clamping system 200 is described in detail in EP 2 639 078 A1.

The invention claimed is:

1. A wheel clamping system for reversibly clamping a motor vehicle wheel with a rim onto a wheel balancing machine, said wheel clamping system comprising:
a hollow main shaft for holding a motor vehicle wheel, said main shaft defining an axial direction and being coupled to a drive means of the wheel balancing machine to rotate the main shaft;
a turntable for providing an abutment for a rim of a motor vehicle wheel held on the main shaft, said turntable being fixedly connected to the main shaft;
a pull rod for pulling a wheel held on the main shaft into abutment with the turntable, said pull rod having a first end portion slidably received within the main shaft and a second end portion protruding beyond the turntable, wherein the first end portion is coupled to an actuator of the wheel balancing machine for axial movement of the pull rod and the second end portion is provided with clamping jaws which are movable between a closed position and an open position, wherein the clamping jaws are within an outer circumference of the main shaft when the clamping jaws are in the closed position and the clamping jaws protrude beyond the outer circumference of the main shaft when the clamping jaws are in the open position;
a handle for acting on a rim of a motor vehicle wheel held on the main shaft, said handle having a coupling surface with which the clamping jaws engage when the clamping jaws are in the open position,
at least one force detecting device for determining an amount of clamping force exerted by the wheel clamping system on a rim of a motor vehicle wheel held on the main shaft;
wherein the at least one force detecting device is operably connected to the handle or the pull rod.

2. The wheel clamping system for reversibly clamping a motor vehicle wheel with a rim onto a tire fitting machine, said tire fitting machine comprising:
a main shaft for holding a motor vehicle wheel, wherein the main shaft is rotatably supported by the tire fitting machine and defines an axial direction, wherein the main shaft comprises a first end portion connected to a drive means of tire fitting machine for rotating the main shaft and a second end portion having a bore;
a turntable for providing an abutment for a rim of a motor vehicle wheel held on the main shaft, said turntable being coupled to the second end portion of the main shaft and axially movable relative to the main shaft;
a fixing element having a contact portion for abutting against a rim of a motor vehicle wheel held on the main shaft, and a shaft, said shaft having a first end portion insertable into the bore of the main shaft and a second end portion on which the contact portion is arranged; and
at least one clamping device for reversibly coupling the fixing element to the main shaft, wherein the shaft of the fixing element has a coupling surface for coupling to the at least one clamping device in order to fix the axial position of the contact portion of the fixing element relative to the main shaft;
at least one force detecting device for determining an amount of clamping force exerted by the wheel clamping system on a rim of a motor vehicle wheel held on the main shaft,
wherein the at least one force detecting device is operably connected to the fixing element or the main shaft.

3. The wheel clamping system according to claim 2, in combination with a tire fitting machine comprising at least one working tool, in particular a tire fitting tool or a tire removal tool, wherein the at least one force detecting device is further adapted to measure the value of a force or a torque which is produced by the at least one working tool when a tire is being fitted onto the rim or when a tire is being removed from the rim of a motor vehicle wheel held on the main shaft.

4. A wheel balancing machine, comprising a wheel clamping system of claim 3.

5. A tire fitting machine, comprising a wheel clamping system of claim 3.

6. A tire fitting machine, comprising a wheel clamping system of claim 2.

7. The wheel clamping system according to claim 2, further comprising an output unit for outputting the value of a clamping force which is exerted on a rim of a motor vehicle wheel held on the main shaft and which is determined by at least one force detecting device.

8. The wheel clamping system according to claim 1, further comprising an output unit for outputting the value of a clamping force which is exerted on a rim of a motor vehicle wheel held on the main shaft and which is determined by at least one force detecting device.

9. The wheel clamping system according to claim 8, wherein the output unit comprises a display device for displaying the determined amount of clamping force.

10. The wheel clamping system according to claim 9, wherein the output unit has a sound generator for outputting an acoustic signal associated with the determined amount of clamping force.

11. The wheel clamping system according to claim 9, wherein the output unit is configured to emit a warning signal if the determined amount of clamping force indicates incorrect clamping or an incorrect clamping position.

12. The wheel clamping system according to claim 8, wherein the output unit has a sound generator for outputting an acoustic signal associated with the determined amount of clamping force.

13. The wheel clamping system according to claim 12, wherein the output unit is configured to emit a warning signal if the determined amount of clamping force indicates incorrect clamping or an incorrect clamping position.

14. The wheel clamping system according to claim 8, wherein the output unit is configured to emit a warning signal if the determined amount of clamping force indicates incorrect clamping or an incorrect clamping position.

15. The wheel clamping system according to claim 8, in combination with a tire fitting machine comprising at least one working tool, in particular a tire fitting tool or a tire removal tool, wherein the at least one force detecting device is further adapted to measure the value of a force or a torque which is produced by the at least one working tool when a tire is being fitted onto the rim or when a tire is being removed from the rim of a motor vehicle wheel held on the main shaft.

16. A wheel balancing machine, comprising a wheel clamping system of claim 15.

17. A tire fitting machine, comprising a wheel clamping system of claim 15.

18. A wheel balancing machine, comprising a wheel clamping system of claim 8.

19. A tire fitting machine, comprising a wheel clamping system of claim 8.

20. A wheel balancing machine, comprising a wheel clamping system of claim 1.

* * * * *